3,192,060
LIGHTWEIGHT AGGREGATE AND METHOD OF PRODUCING SAME
Benjamin L. Tilsen, 1043 Wagon Wheel Trail, St. Paul, Minn.
No Drawing. Filed May 24, 1961, Ser. No. 112,202
12 Claims. (Cl. 106—97)

The present application is a continuation-in-part of my application Serial Number 822,752, filed June 25, 1959, and now abandoned.

This invention relates to the manufacture of lightweight aggregates from generally available, low-cost materials by method employing simple, generally available, hence low-cost machinery.

Specifically, this invention comprises combining raw untreated fly ash or other pozzolans with alkaline earth reactants in the presence of moisture, pelletizing the mixture, and reacting the pozzolan and alkaline earth reactant in the presence of moisture during the pelletizing, and the curing of the finished pellets by holding them in such temperature and moisture conditions and for such periods as will enable the reaction to proceed. At atmospheric temperatures of 50° to 90° F. and humidity conditions in the general range of fifty to ninety percent, the green pellets take a sufficient set in about seven days so that they may be handled. However, in order that the pellets may have sufficient set for use as aggregate, the curing should continue for at least twenty-five days. If any pellets are to be crushed, they are desirably cured for at least thirty days at ambient summer temperature and humidity.

When the pellets have the desired water content, the vapor pressure to which they are subject should at least equal that of the pellet water content at the pellet temperature.

The curing may be accelerated by autoclave treatment. In practice 150 pounds of pressure have been used in such an autoclave with resulting temperatures of about 357° F. and in an atmosphere of steam to cure the pellets in about eight hours, within which time the pellets will be substantially completely reacted.

The finished pellets are either crushed to reasonable screen sizes or are produced in acceptable sizes by controlling the pelletizing process according to known methods. These completed pellets are then screened and graded to be employed with Portland cement in making various concrete products.

Fly ash is greatly preferred as the material to be used in practicing the invention. However, other pozzolans such as volcanic ash, shale high in silica, pumicite, scoria and so forth may be used. A pozzolan is defined as a silica or clay material capable of reaction with lime. In some cases these materials may require flash heating to drive off some of the water of hydration. This is particularly true of certain clays and shales. The flash heating may be conducted at 500° to 600° F. but would more usually run about 1500° F. for a brief period.

As disclosed herein, it has been discovered that raw untreated fly ash, if mixed with alkaline earth reactants and moisture, agglomerated into pellets and properly cured, can be used as lightweight aggregate without special preliminary treatment.

Accordingly, it is the principal object of this invention to provide a lightweight aggregate with pozzolans, particularly raw untreated fly ash, as the principal ingredient.

It is another object of this invention to provide a lightweight aggregate that employs fly ash raw, that is, without any preliminary treatment.

It is still another object of this invention to employ raw untreated fly ash as the principal ingredient of a desirable lightweight aggregate without additives other than moisture and an alkaline reactant.

The use of excess moisture is desirable not only for the reaction but also because the evaporation of excess water leaves voids in the pellets. I may add as much as thirty percent of water by weight to the pre-mixed fly ash or other pozzolan and the alkaline earth reactant. I then evaporate much of the added water during pelletizing to reduce the water content to a total of perhaps seventeen percent to twenty percent, or thereabout, this being the approximate moisture desired to facilitate the pelletizing and reaction. Whereas the original fly ash specific gravity is approximately 2.56, the specific gravity of a typical pellet is about 1.59 to 1.72.

Other objects of the invention will become apparent as the description proceeds.

Basically, the invention consists of mixing from about eighty to ninety-five percent by weight of fly ash or other pozzolan with from twenty to five percent by weight of a suitable alkaline earth reactant such as hydrated high calcium content lime. From a strength standpoint the range of lime content lies between seven and fifteen percent dry weight of solids. There is a sharp peak in this range. However, five to twenty percent lime is acceptable. Water is then added to produce an ultimate moisture content of twelve to twenty percent of the dry weight of the solids, it being preferred to add an excess of water up to perhaps thirty percent of the total by weight and then, during balling, to evaporate off the excess water.

In the preferred continuous operation the pozzolan and the alkaline earth reactant and the water are automatically weighed and delivered together into a pug mill and then into a high impact mixer to assure thorough and complete mixing and dispersion of the reactant materials.

From the mixer the materials are discharged into a suitable balling or agglomerating structure such as a drum-, pan-, or disk-type pellitizer depending on the equipment available and the type of pellets desired. The agglomerating equipment is conventional and can be used by the artisan to produce desired-size pellets by controlling moisture, rate of feed and the speed of the device, as is well-known. For my purposes pellets of less than 1/16" average diameter to as much as 1/2" are useful. The entire range will ordinarily be produced in a balling drum.

If an excess of moisture has been added air will desirably be circulated across the mix ruring pelletizing to evaporate the water until it reaches the desired level. Seventeen percent moisture content is preferred for the fly ash I customarily use, but the range has been indicated to be twelve to twenty percent in ordinary practice.

The agglomerated particles are then cured by either maintaining them at room temperature in a moist atmosphere for a sustained period of time, such as twenty-five to thirty-five days; or, in some instances, by heating them under pressure adequate to maintain moist conditions as, for example, subjecting them to a temperature of about 300° to 400° F. for a period of about four to twelve hours, eight being adequate for most materials. A specific suggestion is to cure the pellets by heating to 350° F. under pressure in an atmosphere of steam for five hours.

The cured pellets, depending on their size, may be either used as produced or screened and stock-piled according to screen sizes to be recombined as appropriate aggegates. In instances when the agglomerated pellets are very large, they may first be reduced to a maximum size of one-half inch in diameter and thereafter screened and graded according to usual practice. After the pellets have formed, they may be coated with Portland cement if desired. The Portland cement is introduced dry into the pelletizer in an amount which may be equal to about three to five percent of the weight of the material of the pellets. In the continued operation of the pelletizer the pellets will be thoroughly coated. I has been found that such coatings make the pellets more resistant to damage by freezing and thawing, but there appears to be little or no other advantage.

The invention is illustrated by the following examples.

*Example 1*

A mixture was made of ninety percent by weight raw untreated fly ash and ten percent by weight of high calcium lime. Sufficient moisture was added to bring the total moisture content up to seventeen percent in order to permit pelletizing or agglomerating. The actual amount of water added depends greatly upon the surface area of the material to be agglomerated. Even as between fly ash samples taken at different times from the same source, the water requirement will vary widely. Furnaces using identical coal but operated under different conditions of draft and temperature will sometimes produce materials varying in surface area by as much as 2,000 square centimeters per gram. The moisture required varies in proportion to the surface area. The right moisture can be determined by visual inspection during pelletizing. The pellets will form more readily when there is sufficient water so that the pellets have a shiny surface. However, it is desirable that the excess water be evaporated off until the surface ceases to be shiny. In the stated example, the resulting pellets had an average diameter of about one-half inch. They were cured (held for re-action) thirty days at room temperature in a moist atmosphere and thereafter the pellets were ready for use as aggregate.

*Example 2*

A further mixture was made up of 95 parts by weight of raw untreated fly ash and 5 parts by weight of high calcium lime. The moisture content of the mixture was raised to about thirty percent. The mixture was fed to a pan pelletizer and excess moisture was evaporated off by circulating hot air across the mixture during pelletizing until the surfaces of the pellets ceased to be shiny. Balls having an average diameter of about ⅜″ were produced. These pellets were cured by standing for twenty-five days in a warm humid atmosphere.

*Example 3*

A mixture was made up according to Example 1 and charged into a balling drum. Dry Portland cement was charged into the pelletizer near the discharge end at a rate equal to about four percent of the total combined weight of the dry ingredients, namely the fly ash and lime. As the pelletizer was continued in operation, each of the pellets was coated with the Portland cement powder. Enough moisture remained on the pellets to hydrate the dry cement so that a layer of neat cement was formed on the outside of each pellet. Thereafter the aggregate was cured by being maintained in a moist atmosphere at room temperature for thirty days.

In the methods of the examples described above, an alternative method of curing is to heat the pellets about five hours to twelve hours at about 200° to 600° F. under pressure to maintain a moist atmosphere. Four to twelve hours of such accelerated curing produces strength equal to or greater than that achieved by thirty days of curing at room temperature. A further advantage of the increased temperature of curing is that fly ash will more readily react with lime at an elevated temperature applied in the presence of moisture.

Wet fly ash may be utilized in any of the described examples with slight modification. A high impact mixer (such as Strong-Scott "Turbulizer") is used. Intimate admixture is very important and is easily and rapidly accomplished with proper equipment when the fly ash is wet. Since wet fly ash contains about ten percent moisture, only enough additional moisture need be added to bring the total into the range needed for good balling qualities.

Aggregates thus formed by agglomerating a mixture of fly ash with earth alkaline reactants such as lime, or dolomitic lime will combine readily with Portland cement and water to form very satisfactory materials from which to make concrete products of various kinds. Pelletizing before use in finished products avoids the difficulties described in the prior art when the fly ash is incorporated directly into the end product. It is unnecessary to add rosin or other similar materials to avoid efflorescence; crushed clinker or other larger particle material to permit the escape of trapped air; or to compress the agglomerated particles to discharge gases. Consequently, it is clear that relatively simple machinery may be used to produce this highly desirable lightweight aggregate wherever fly ash is produced as a waste product from burning powdered coal.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A method of rendering raw fly ash useful as a lightweight aggregate for use in the making of concrete, said method comprising mixing eighty to ninety-five parts of fly ash with five to twenty parts by weight of a lime reactant, adding sufficient water to permit agglomeration, agglomerating into pellets and storing the pellets under humid conditions until reaction is substantially complete.

2. The method of claim 1 wherein storing is effected at temperatures of about 50°–90° F. for about twenty five to thirty five days.

3. The method of claim 1 wherein curing comprises heating to 350° F. under pressure in an atmosphere of steam for five hours.

4. A method of rendering raw fly ash useful as a lightweight aggregate in the making of concrete, said method comprising mixing at least approximately eighty to ninety-five parts of fly ash with no more than approximately five to twenty parts by weight of an earth lime reactant, mixing with said fly ash and reactant an amount of water in substantial excess of that ultimately retained, agglomerating the wet fly ash and reactant into pellets while evaporating the excess of water to leave the pellet water content amounting to approximately twelve to twenty percent of the total weight of the pellets, and storing the pellets while exposing them to humid atmosphere until reaction of the reactant with the fly ash is substantially complete, the evaporation of water from the mixture leaving the specific gravity of the pellets materially less than that of the fly ash.

5. The method recited in claim 4 in which the reactant reacts with the fly ash substantially at ambient temperatures for a period in excess of twenty five days.

6. The method recited in claim 4 in which the reactant reacts with the fly ash at temperatures materially in excess of the boiling point of water and under pressures sufficient to maintain a vapor pressure to which the pellets are exposed and which is at least equal to the vapor pressure of the water in the pellets.

7. For use in the making of concrete, a lightweight dry aggregate comprising cured agglomerated pellets at least a majority of which do not exceed one-half inch in cross section and all consisting essentially of intimately admixed and interacted raw fly ash and a lime, the fly ash constituting eighty to ninety-five percent by weight of the fly ash and the lime combined, the pellets as cured and preliminary to use as an aggregate, each being coated individually with neat Portland cement.

8. A lightweight aggregate for use in a concrete mix and comprising pellets of mixed and reacted raw fly ash and an alkaline earth lime, the fly ash constituting eighty to ninety-five percent by weight and the lime constituting five to twenty percent by weight of the combined total dry weight of fly ash and lime, the pellets containing approximately seventeen to twenty percent by weight of water and having a specific gravity materially less than the initial specific gravity of their content of fly ash and lime.

9. A method of making concrete which consists in the steps of mixing cement and water with a lightweight aggregate prepared by previously mixing fly ash with an alkaline earth lime reactant in the proportions of at least 80 to ninety-five parts of fly ash with no more than five to 20 parts by weight of said reactant and with sufficient water to permit agglomeration, and agglomerating the mixture of fly ash and reactant into pellets and storing the pellets under humid conditions until reaction between the fly ash and the reactant is substantially complete preliminary to the use of said pellets as said aggregate as aforesaid.

10. A method according to claim 9 in which the said pellets average less than one-half inch in cross section.

11. A method according to claim 9 in which the pellets are crushed to make the aggregate used in making the concrete.

12. A method according to claim 9 in which an excess of water is incorporated in the pellets during the agglomeration of the fly ash and said reactant and a portion thereof is evaporated during storage of the pellets, leaving voids for reducing the weight of the pellets used as aggregate.

References Cited by the Examiner

UNITED STATES PATENTS

| | | | |
|---|---|---|---|
| 1,440,234 | 12/22 | North | 106—118 |
| 2,942,993 | 6/60 | Handy et al. | 106—118 |
| 2,946,112 | 7/60 | Tucker et al. | |
| 2,948,948 | 8/60 | Duplin et al. | |

OTHER REFERENCES

Lea & Desch: "Chemistry of Cement and Concrete," Edward Arnold Ltd., London, 1955, page 336.

TOBIAS E. LEVOW, *Primary Examiner.*

JOSEPH REBOLD, *Examiner.*